US011753308B1

(12) United States Patent
Wu et al.

(10) Patent No.: US 11,753,308 B1
(45) Date of Patent: Sep. 12, 2023

(54) METHOD FOR SEPARATING AND EXTRACTING RARE-EARTH AND REGENERATING RARE-EARTH POLISHING POWDER FROM RARE-EARTH POLISHING POWDER WASTE

(71) Applicant: BEIJING UNIVERSITY OF TECHNOLOGY, Beijing (CN)

(72) Inventors: Yufeng Wu, Beijing (CN); Minwei Song, Beijing (CN); Qijun Zhang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/139,844

(22) Filed: Apr. 26, 2023

Related U.S. Application Data

(63) Continuation of application No. PCT/CN2021/132046, filed on Nov. 22, 2021.

(30) Foreign Application Priority Data

Dec. 2, 2020  (CN) .......................... 202011395569.4

(51) Int. Cl.
  *C22B 59/00*  (2006.01)
  *C01F 17/241*  (2020.01)
  (Continued)

(52) U.S. Cl.
  CPC .............. *C01F 17/241* (2020.01); *C09G 1/02* (2013.01); *C09K 3/1418* (2013.01); *C22B 1/005* (2013.01); *C22B 7/007* (2013.01); *C22B 59/00* (2013.01)

(58) Field of Classification Search
  CPC ....... C01F 17/241; C09G 1/02; C09K 3/1418; C22B 1/005; C22B 7/007; C22B 59/00
  (Continued)

(56) References Cited

U.S. PATENT DOCUMENTS

2015/0184027 A1    7/2015  Huang

FOREIGN PATENT DOCUMENTS

| CN | 101475777 | 7/2009 |
| CN | 102337086 A | 2/2012 |

(Continued)

OTHER PUBLICATIONS

"Production and Application of Rare Earth Polishing Powder", Journal of the Chinese Rare Earth Society, vol. 20, No. 5, Oct. 2002.

(Continued)

*Primary Examiner* — Melissa S Swain
(74) *Attorney, Agent, or Firm* — J.C. PATENTS

(57) ABSTRACT

The invention relates to a method of separating and extracting rare-earths from rare-earth polishing powder waste and regenerating rare-earth polishing powder, which is characterized by: firstly, process the waste powder with first acid leaching, alkali roasting, and second acid leaching to separate and extract rare-earths from rare-earth polishing powder waste to obtain the leaching solution of rare-earth chloride; secondly, precipitate from the leaching solution with ammonia to remove impurities and hydrochloric acid solution to obtain the purified solution of rare-earth chloride; thirdly, co-precipitate from the solution acquired in the second step with hydrofluoric acid, ammonium bicarbonate, and dispersant to obtain the lanthanum cerium fluoro-carbonate; and finally, after drying, two-stage high-temperature calcination, and ball milling, the regenerated rare-earth polishing powder with decent polishing performance can be obtained. The total leaching efficiency of rare-earths in the rare-earth polishing powder waste of the present invention reaches more than 95%, and the total recovery efficiency of rare-earths reaches more than 93%, which realizes the efficient separation, extraction, and regeneration of rare-earths in the rare-earth polishing powder waste.

3 Claims, 1 Drawing Sheet

(51) Int. Cl.
*C09K 3/14* (2006.01)
*C22B 1/00* (2006.01)
*C22B 7/00* (2006.01)
*C09G 1/02* (2006.01)

(58) Field of Classification Search
USPC .......................................................... 423/21.1
See application file for complete search history.

(56) References Cited

FOREIGN PATENT DOCUMENTS

| | | |
|---|---|---|
| CN | 102659559 A | 9/2012 |
| CN | 103103361 A | 5/2013 |
| CN | 104087757 A | 10/2014 |
| CN | 108531735 A | 9/2018 |
| CN | 108659714 A | 10/2018 |
| CN | 109022796 A | 12/2018 |
| CN | 110241309 A | 9/2019 |
| CN | 111471865 A | 7/2020 |
| CN | 112725623 A | 4/2021 |
| JP | 2009083082 | 4/2009 |
| KR | 20040055219 A | 6/2004 |
| RU | 2006100039 A | 7/2007 |

OTHER PUBLICATIONS

First Search Report of the priority application CN202011395569.4.
Second Search Report of the priority application CN202011395569.4.
International Search Report for PCT/CN2021/132046.

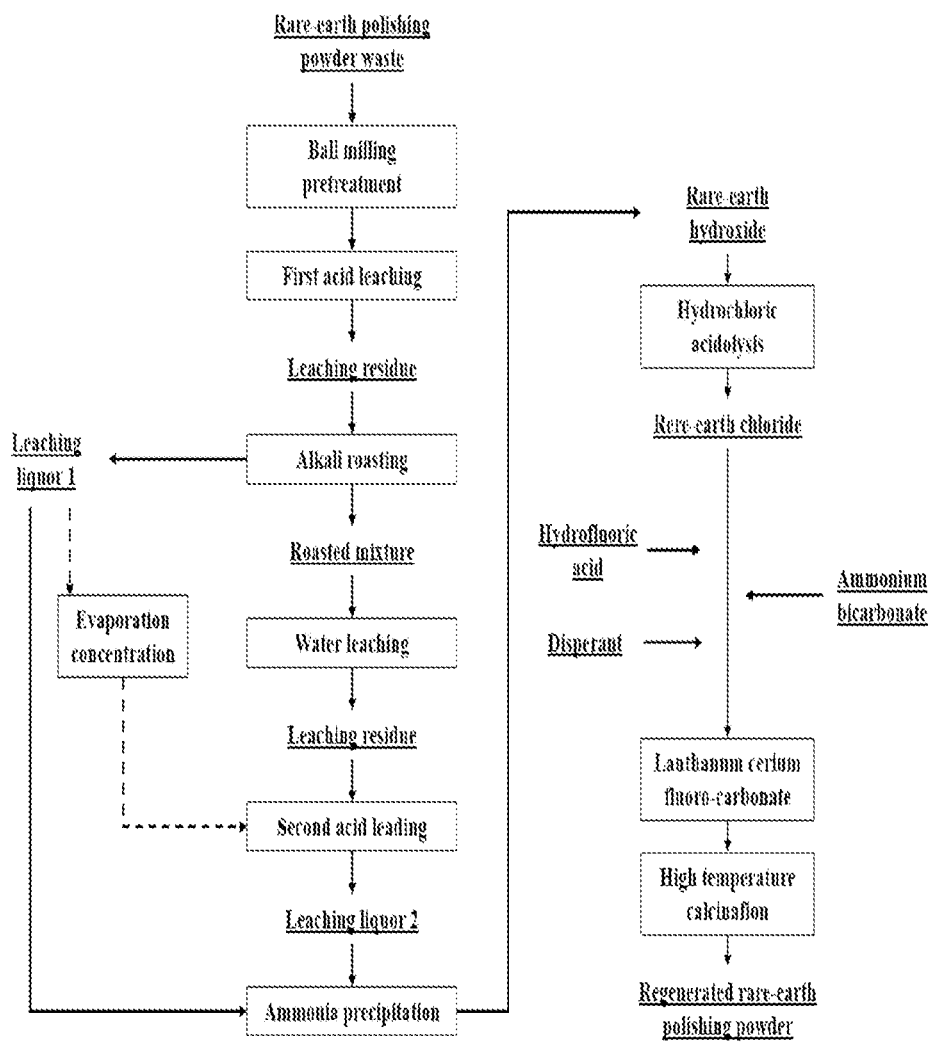

METHOD FOR SEPARATING AND EXTRACTING RARE-EARTH AND REGENERATING RARE-EARTH POLISHING POWDER FROM RARE-EARTH POLISHING POWDER WASTE

CROSS-REFERENCE TO RELATED APPLICATIONS

This application is a continuation of International Application No. PCT/CN2021/132046, filed on Nov. 22, 2021, which claims priority to Chinese Patent Application No. 202011395569.4, filed on Dec. 2, 2020, both of which are hereby incorporated by reference in their entireties.

TECHNICAL FIELD

The invention relates to a method for recycling rare-earth polishing powder waste and, in particular, to a method for separating and extracting rare-earth and regenerating rare-earth polishing powder from rare-earth polishing powder waste.

BACKGROUND ART

In recent years, with the rapid development of electronic equipment such as touch screens and LCDs, the requirements for surface quality and polishing accuracy of glass substrates are becoming more and more stringent. Compared with traditional surface grinders such as $Fe_2O_3$ and $Al_2O_3$, rare-earth polishing powder has the advantages of finer particle size, better chemical activity, stronger grinding ability and longer service life, and is widely used in the polishing of glass products like glass optical components, the glass body of CRT tubes, optical glasses, plate glass, oscilloscope tubes, plexiglass and so on. The large-scale application of rare-earth polishing powder has led to a year-by-year increase of the production of rare-earth polishing powder waste in China. Relevant data show that the annual production of rare-earth polishing powder waste in China exceeds 100,000 tons. Rare-earth polishing powder can be divided into high-cerium polishing powder ($CeO_2 \geq 99\%$), medium-cerium polishing powder ($50\% < CeO_2 < 80\%$) and low-cerium polishing powder ($CeO_2 \leq 50\%$) according to the content of $CeO_2$, while also containing a small amount of rare-earth elements like La, Nd and Pr. Rare-earths are an important strategic resource in China. Due to unplanned mining and excessive exports, the reserves of rare-earth resources in China have dropped from 74% of the world to 23%. Rare-earth polishing powder waste contains a large amount of rare-earth resources. Promote the recycle of rare-earth in rare-earth polishing powder waste can not only prevent excessive mining of primary rare-earth mineral resources, but also provide economic value, and has important environment and economic benefits.

Chinese patent CN 109022796A publishes an environment-friendly low-temperature method for recovering rare-earth from polishing waste. The method adopts hydrochloric acid as leaching solution; activated carbon, carbon sludge or carbon fiber as reducing agent; and fluorite, cryolite or NaF as catalyst, and achieves a combined leaching of rare-earth in rare-earth polishing powder waste, whose total recovery efficiency of rare-earth was 6.8~89%. In Chinese patent CN 102659559A, concentrated sulfuric acid is used to extract rare-earths in rare-earth polishing powder waste to obtain leaching solution (lanthanum sulfate and cerium sulfate), and oxalic acid is used to recover Ce and La and calcined the obtained oxalates to convert them into their respective oxides. However, these methods use strong acid as leaching reagent, and when the rare-earth polishing powder waste contains $CeO_2$, $LaF_3$, LaOF and other compounds that are insoluble in acid, there will be disadvantages such as low rare-earth recovery efficiency and poor universality.

Chinese patent CN 103103361A introduces a method to recover rare-earth oxide from the rare-earth polishing powder waste. The method first uses alkali roasting to pretreat the rare-earth polishing powder waste, and the product goes through following processes including water leaching, acid leaching, washing, oxalic acid precipitation and high temperature calcination to obtain rare-earth oxide products. The advantage of the method is that $LaF_3$, LaOF or $CeO_2$ in the rare-earth polishing powder waste, which are insoluble in acid, would melt and thus experience phase transformation, and transform into acid-soluble rare-earth oxide or rare-earth hydroxide. However, the method uses a large amount of alkali, and thus lead to high cost. A large amount of alkaline effluent and residue are also generated during the process.

Currently, there's a large demand for rare-earth polishing powder in Chinese market. According to statistics, the rare-earth polishing powder production in China in 2016 has reached 22,000 tons, and it has been increasing by 10%-20% year on year. But the production of rare-earth polishing powder consumes a large amount of rare-earth resources of La and Ce. Therefore, in order to better recycle rare-earth secondary resources and protect rare-earth resources in China, research on the development of a recycling process with high universality, high rare-earth recovery efficiency and low-level environmental pollution was developed to separate and extract rare-earth from rare-earth polishing powder waste and directly prepare and regenerate rare-earth polishing power has strategic significance.

DETAILED DESCRIPTION

The purpose of the invention is to mitigate the deficiencies of the existing technology of recovering rare-earth in rare-earth polishing powder waste. The invention adopts acid and alkali activation process to separate and extract rare-earth from rare-earth polishing powder waste and use the separated and extracted rare-earth to directly regenerate rare-earth polishing powder, thus improving the efficiency of recycling rare-earth polishing powder waste. The method of the invention has advantages of high rare-earth recovery efficiency, wide applicability, little pollution, etc.

The process of separating and extracting rare-earth and regenerating rare-earth polishing powder from rare-earth polishing powder waste, as described above, involves the following steps:

(1) Ball milling pretreatment: the rare-earth polishing powder waste is ball milled to the particle size of less than 200 mesh to obtain ball milled waste;

(2) First acid leaching: put the ball milled waste obtained in step (1) into a container and add hydrochloric acid solution. Heat and stir the mixture to promote acid leaching reaction, and filter after the first acid leaching process to obtain the solid residue and leaching liquor 1. The molar concentration of hydrochloric acid solution is 5~8 mol/L, the solid-liquid ratio of ball milled waste and hydrochloric acid solution is 1 kilogram: 4~8 liter, the leaching temperature is 70~80° C., and the leaching time is 1~3 hours at a stirring speed of 500~600 rpm;

(3) Alkali roasting: mix the leaching residue obtained in step (2) with alkali and roast the mixture. The mass ratio of leaching residue and alkali is 1:1~1:5, the roasting temperature is 800~1000° C., and the roasting time is 1~3 hours;

(4) Water leaching: put the roasted mixture obtained in step (3) in water and stir. The solid-to-liquid ratio of the roasted mixture and water is 1 kg:4~9 L in the water leaching process, the water leaching temperature is 80~90° C., the leaching time is 2~3 hours, and the stirring speed is 500 to 600 rpm. After the water leaching reaction finishes, separate the solid residue from the liquid and filtrate to obtain the water leached residue;

(5) Second acid leaching: add hydrochloric acid solution into the water leaching residue obtained in step (4) for a secondary acid leaching process, and after the secondary acid leaching reaction is completed, separate the solid and the liquid and filtrate to obtain the leaching liquor 2. The molar concentration of hydrochloric acid solution is 6~10 mol/L, the solid-liquid ratio of the water leached residue and the hydrochloric acid solution is 1 kg:4~10 L, the leaching temperature is 80~90° C., the leaching time is 2~6 hours, and the stirring speed is 500~600 rpm;

(6) Preparation of rare-earth hydroxide: mix the leaching liquor 1 obtained in step (2) and the leaching liquor 2 obtained in step (5). Add ammonia solution with a mass percentage of 25% to the mixed solution while heating and stirring, until the pH of the solution reaches 8~9. Filtrate the mixture to obtain the rare-earth hydroxide. The heating temperature is 90~95° C., and the stirring speed is 500~600 rpm;

(7) Preparation of rare-earth chloride solution: add hydrochloric acid solution with a mass percentage of 37% to the rare-earth hydroxide obtained in step (6) for acidolysis, and after the white precipitate disappears, continue to add hydrochloric acid with a concentration of 37% by mass to the extend when the pH reaches 2~4 to obtain rare-earth chloride solution;

(8) Preparation of lanthanum cerium fluoro-carbonate: add hydrofluoric acid with a mass percentage of 40% to the rare-earth chloride solution obtained in step (7), and then add ammonium bicarbonate solution with a mass concentration of 100~120 g/L at a rate of 20~30 ml/min while stirring. Finally, add dispersant to the mixed solution while stirring, age in a constant temperature water bath for 2~4 hours, and filter to obtain lanthanum cerium fluoro-carbonate; the volume ratio of rare-earth chloride to hydrofluoric acid is 20:1~40:1, and the volume ratio of ammonium bicarbonate solution and rare-earth chloride solution is 1:1. The temperature of water bath is 50~60° C., the mass percentage of dispersant is 1~2%, and the stirring speed is 800~1000 rpm;

(9) Regenerate rare-earth polishing powder: dry the lanthanum cerium fluoro-carbonate obtained in step (8) at 105° C. for 24 hours, and calcine at high temperature in a muffle furnace. The calcine process is as follows: raise the temperature from room temperature to 600° C.; keep at 600° C. for 2~3 hours; then raise the temperature from 600° C. to 1000° C. at a heating speed of 1° C./min; keep at 1000° C. for 4~6 hours; ball mill and obtain the regenerated rare-earth polishing powder.

The alkali used in the alkali roasting process in the step (3) should be NaOH or KOH.

The leaching liquor 1 obtained in the step (2) can be evaporated and concentrated to a molar concentration of HCl of 5 to 8 mol/L, and partially or fully replace the hydrochloric acid solution in the secondary acid leaching process of the step (5).

The dispersant in the step (8) should be one of the followings: polyethylene glycol-400, polyethylene glycol-600 or polyethylene glycol-800.

Polyethylene glycol-400 (product number: P103737), polyethylene glycol-600 (product number: P103727) and polyethylene glycol-800 (product number: P103726) were purchased from Shanghai Aladdin Biochemical Technology Co., Ltd.

The above polyethylene glycol products are generally represented by the following formula:

$$HO[CH_2CH_2O]_nCH_2CH_2OH$$

They are composed of a mixture of polyethylene glycols with different molecular weights. Therefore, they are classified depending on their number-average molecular weight. Thus, polyethylene glycol-400 is polyethylene glycol with a number-average molecular weight of 400, polyethylene glycol-600 is polyethylene glycol with a number-average molecular weight of 600, and polyethylene glycol-800 is polyethylene glycol with a number-average molecular weight of 800.

Compared with the existing rare-earth recovery process in rare-earth polishing powder waste, the process of the invention adopts an acid-alkali activation process to jointly process rare-earth polishing powder waste, which can increase the rare-earth leaching efficiency to more than 95% while reducing the amount of alkali used. By utilizing the leached rare-earth solution to regenerate rare-earth polishing powder, the total recovery yield of rare-earth reached more than 93%. The regenerated rare-earth polishing powder has good polishing performance, and the purpose of recycling rare-earth polishing powder waste is well achieved.

BRIEF DESCRIPTION OF THE DRAWINGS

FIG. 1A flow chart of the method for separating and extracting rare-earth from rare-earth polishing powder waste and regenerating rare-earth polishing powder.

EXAMPLES

Example 1

The rare-earth polishing powder waste is proceeded as follows:

(1) Ball milling pretreatment: the rare-earth polishing powder waste, whose total mass fraction of rare-earth oxides is 30%, is ball-milled to a particle size of 200 mesh to obtain ball-milled waste;

(2) First acid leaching: put the ball milled waste obtained in step (1) into a container and add hydrochloric acid solution. Heat and stir the mixture to promote acid leaching reaction, and filter after the first acid leaching process to obtain the solid residue and leaching liquor 1. The molar concentration of hydrochloric acid solution is 6 mol/L, the solid-liquid ratio of ball milled waste and hydrochloric acid solution is 1 kilogram: 7 liter, the leaching temperature is 80° C., and the leaching time is 3 hours at a stirring speed of 500 rpm;

(3) Alkali roasting: mix the leaching residue obtained in step (2) with alkali and roast the mixture. The mass ratio of leaching residue and alkali is 1:4, the roasting temperature is 800° C., and the roasting time is 2 hours;

(4) Water leaching: put the roasted mixture obtained in step (3) in water and stir. The solid-to-liquid ratio of the roasted mixture and water is 1 kg:8 L in the water leaching process, the water leaching temperature is 80° C., the leaching time is 2 hours, and the stirring speed is 600 rpm. After the water leaching reaction finishes, separate the solid residue from the liquid and filtrate to obtain the water leached residue;

(5) Second acid leaching: add hydrochloric acid solution into the water leaching residue obtained in step (4) for a secondary acid leaching process, and after the secondary acid leaching reaction is completed, separate the solid and the liquid and filtrate to obtain the leaching liquor 2. The molar concentration of hydrochloric acid solution is 8 mol/L, the solid-liquid ratio of the water leached residue and the hydrochloric acid solution is 1 kg:7 L, the leaching temperature is 80° C., the leaching time is 2 hours, and the stirring speed is 600 rpm;

(6) Preparation of rare-earth hydroxide: mix the leaching liquor 1 obtained in step (2) and the leaching liquor 2 obtained in step (5). Add ammonia solution with a mass percentage of 25% to the mixed solution while heating and stirring, until the pH of the solution reaches 8. Filtrate the mixture to obtain the rare-earth hydroxide. The heating temperature is 90° C., and the stirring speed is 600 rpm;

(7) Preparation of rare-earth chloride solution: add hydrochloric acid solution with a mass percentage of 37% to the rare-earth hydroxide obtained in step (6) for acidolysis, and after the white precipitate disappears, continue to add hydrochloric acid with a concentration of 37% by mass to the extend when the pH reaches 2 to obtain rare-earth chloride solution;

(8) Preparation of lanthanum cerium fluoro-carbonate: add hydrofluoric acid with a mass percentage of 40% to the rare-earth chloride solution obtained in step (7), and then add ammonium bicarbonate solution with a mass concentration of 110 g/L at a rate of 20 ml/min while stirring. Finally, add polyethylene glycol-400 to the mixed solution while stirring, age in a constant temperature water bath for 4 hours, and filter to obtain lanthanum cerium fluoro-carbonate; the volume ratio of rare-earth chloride to hydrofluoric acid is 30:1, and the volume ratio of ammonium bicarbonate solution and rare-earth chloride solution is 1:1. The temperature of water bath is 60° C., the mass percentage of polyethylene glycol-400 is 2%, and the stirring speed is 800 rpm;

(9) Regenerate rare-earth polishing powder: dry the lanthanum cerium fluoro-carbonate obtained in step (8) at 105° C. for 24 hours, and calcine at high temperature in a muffle furnace. The calcine process is as follows: raise the temperature from room temperature to 600° C.; keep at 600° C. for 3 hours; then raise the temperature from 600° C. to 1000° C. at a heating speed of 1° C./min; keep at 1000° C. for 5 hours; ball mill and obtain the regenerated rare-earth polishing powder.

The total leaching efficiency of rare earths in waste rare earth polishing powder was 95.5%, and the total recovery efficiency of rare earths was 93.2%.

Example 2

The rare-earth polishing powder waste is proceeded as follows:

(1) Ball milling pretreatment: the rare-earth polishing powder waste, whose total mass fraction of rare-earth oxides is 40%, is ball-milled to a particle size of 400 mesh to obtain ball-milled waste;

(2) First acid leaching: put the ball milled waste obtained in step (1) into a container and add hydrochloric acid solution. Heat and stir the mixture to promote acid leaching reaction, and filter after the first acid leaching process to obtain the solid residue and leaching liquor 1. The molar concentration of hydrochloric acid solution is 5 mol/L, the solid-liquid ratio of ball milled waste and hydrochloric acid solution is 1 kilogram: 8 liter, the leaching temperature is 70° C., and the leaching time is 3 hours at a stirring speed of 600 rpm;

(3) Alkali roasting: mix the leaching residue obtained in step (2) with alkali and roast the mixture. The mass ratio of leaching residue and alkali is 1:1, the roasting temperature is 1000° C., and the roasting time is 3 hours;

(4) Water leaching: put the roasted mixture obtained in step (3) in water and stir. The solid-to-liquid ratio of the roasted mixture and water is 1 kg:6 L in the water leaching process, the water leaching temperature is 80° C., the leaching time is 3 hours, and the stirring speed is 500 rpm. After the water leaching reaction finishes, separate the solid residue from the liquid and filtrate to obtain the water leached residue;

(5) Second acid leaching: add hydrochloric acid solution into the water leaching residue obtained in step (4) for a secondary acid leaching process, and after the secondary acid leaching reaction is completed, separate the solid and the liquid and filtrate to obtain the leaching liquor 2. The molar concentration of hydrochloric acid solution is 6 mol/L, the solid-liquid ratio of the water leached residue and the hydrochloric acid solution is 1 kg:8 L, the leaching temperature is 80° C., the leaching time is 6 hours, and the stirring speed is 600 rpm;

(6) Preparation of rare-earth hydroxide: mix the leaching liquor 1 obtained in step (2) and the leaching liquor 2 obtained in step (5). Add ammonia solution with a mass percentage of 25% to the mixed solution while heating and stirring, until the pH of the solution reaches 9. Filtrate the mixture to obtain the rare-earth hydroxide. The heating temperature is 90° C., and the stirring speed is 500 rpm;

(7) Preparation of rare-earth chloride solution: add hydrochloric acid solution with a mass percentage of 37% to the rare-earth hydroxide obtained in step (6) for acidolysis, and after the white precipitate disappears, continue to add hydrochloric acid with a concentration of 37% by mass to the extend when the pH reaches 2 to obtain rare-earth chloride solution;

(8) Preparation of lanthanum cerium fluoro-carbonate: add hydrofluoric acid with a mass percentage of 40% to the rare-earth chloride solution obtained in step (7), and then add ammonium bicarbonate solution with a mass concentration of 120 g/L at a rate of 20 ml/min while stirring. Finally, add polyethylene glycol-600 to the mixed solution while stirring, age in a constant temperature water bath for 2 hours, and filter to obtain lanthanum cerium fluoro-carbonate; the volume ratio of rare-earth chloride to hydrofluoric acid is 20:1, and the volume ratio of ammonium bicarbonate solution and rare-earth chloride solution is 1:1. The temperature of water bath is 60° C., the mass percentage of polyethylene glycol-600 is 2%, and the stirring speed is 900 rpm;

(9) Regenerate rare-earth polishing powder: dry the lanthanum cerium fluoro-carbonate obtained in step (8) at 105° C. for 24 hours, and calcine at high temperature in a muffle furnace. The calcine process is as follows: raise the temperature from room temperature to 600° C.; keep at 600° C. for 3 hours; then raise the temperature from 600° C. to 1000° C. at a heating speed of 1° C./min; keep at 1000° C. for 6 hours; ball mill and obtain the regenerated rare-earth polishing powder.

The total leaching efficiency of rare earths in waste rare earth polishing powder was 96.1%, and the total recovery efficiency of rare earths was 93.6%.

Example 3

The rare-earth polishing powder waste is proceeded as follows:
(1) Ball milling pretreatment: the rare-earth polishing powder waste, whose total mass fraction of rare-earth oxides is 50%, is ball-milled to a particle size of 400 mesh to obtain ball-milled waste;
(2) First acid leaching: put the ball milled waste obtained in step (1) into a container and add hydrochloric acid solution. Heat and stir the mixture to promote acid leaching reaction, and filter after the first acid leaching process to obtain the solid residue and leaching liquor 1. The molar concentration of hydrochloric acid solution is 8 mol/L, the solid-liquid ratio of ball milled waste and hydrochloric acid solution is 1 kilogram: 4 liter, the leaching temperature is 75° C., and the leaching time is 1 hours at a stirring speed of 600 rpm;
(3) Alkali roasting: mix the leaching residue obtained in step (2) with alkali and roast the mixture. The mass ratio of leaching residue and alkali is 1:3, the roasting temperature is 900° C., and the roasting time is 3 hours;
(4) Water leaching: put the roasted mixture obtained in step (3) in water and stir. The solid-to-liquid ratio of the roasted mixture and water is 1 kg:6 L in the water leaching process, the water leaching temperature is 80° C., the leaching time is 3 hours, and the stirring speed is 550 rpm. After the water leaching reaction finishes, separate the solid residue from the liquid and filtrate to obtain the water leached residue;
(5) Second acid leaching: add hydrochloric acid solution into the water leaching residue obtained in step (4) for a secondary acid leaching process, and after the secondary acid leaching reaction is completed, separate the solid and the liquid and filtrate to obtain the leaching liquor 2. The molar concentration of hydrochloric acid solution is 9 mol/L, the solid-liquid ratio of the water leached residue and the hydrochloric acid solution is 1 kg:10 L, the leaching temperature is 85° C., the leaching time is 4 hours, and the stirring speed is 500 rpm;
(6) Preparation of rare-earth hydroxide: mix the leaching liquor 1 obtained in step (2) and the leaching liquor 2 obtained in step (5). Add ammonia solution with a mass percentage of 25% to the mixed solution while heating and stirring, until the pH of the solution reaches 9. Filtrate the mixture to obtain the rare-earth hydroxide. The heating temperature is 90° C., and the stirring speed is 600 rpm;
(7) Preparation of rare-earth chloride solution: add hydrochloric acid solution with a mass percentage of 37% to the rare-earth hydroxide obtained in step (6) for acidolysis, and after the white precipitate disappears, continue to add hydrochloric acid with a concentration of 37% by mass to the extend when the pH reaches 4 to obtain rare-earth chloride solution;
(8) Preparation of lanthanum cerium fluoro-carbonate: add hydrofluoric acid with a mass percentage of 40% to the rare-earth chloride solution obtained in step (7), and then add ammonium bicarbonate solution with a mass concentration of 110 g/L at a rate of 25 ml/min while stirring. Finally, add polyethylene glycol-600 to the mixed solution while stirring, age in a constant temperature water bath for 3 hours, and filter to obtain lanthanum cerium fluoro-carbonate; the volume ratio of rare-earth chloride to hydrofluoric acid is 30:1, and the volume ratio of ammonium bicarbonate solution and rare-earth chloride solution is 1:1. The temperature of water bath is 50° C., the mass percentage of polyethylene glycol-600 is 2%, and the stirring speed is 1000 rpm;
(9) Regenerate rare-earth polishing powder: dry the lanthanum cerium fluoro-carbonate obtained in step (8) at 105° C. for 24 hours, and calcine at high temperature in a muffle furnace. The calcine process is as follows: raise the temperature from room temperature to 600° C.; keep at 600° C. for 2 hours; then raise the temperature from 600° C. to 1000° C. at a heating speed of 1° C./min; keep at 1000° C. for 4 hours; ball mill and obtain the regenerated rare-earth polishing powder.

The total leaching efficiency of rare earths in waste rare earth polishing powder was 96.7%, and the total recovery efficiency of rare earths was 94.2%.

Example 4

The rare-earth polishing powder waste is proceeded as follows:
(1) Ball milling pretreatment: the rare-earth polishing powder waste, whose total mass fraction of rare-earth oxides is 60%, is ball-milled to a particle size of 400 mesh to obtain ball-milled waste;
(2) First acid leaching: put the ball milled waste obtained in step (1) into a container and add hydrochloric acid solution. Heat and stir the mixture to promote acid leaching reaction, and filter after the first acid leaching process to obtain the solid residue and leaching liquor 1. The molar concentration of hydrochloric acid solution is 7 mol/L, the solid-liquid ratio of ball milled waste and hydrochloric acid solution is 1 kilogram:4 liter, the leaching temperature is 75° C., and the leaching time is 3 hours at a stirring speed of 600 rpm;
(3) Alkali roasting: mix the leaching residue obtained in step (2) with alkali and roast the mixture. The mass ratio of leaching residue and alkali is 1:5, the roasting temperature is 800° C., and the roasting time is 3 hours;
(4) Water leaching: put the roasted mixture obtained in step (3) in water and stir. The solid-to-liquid ratio of the roasted mixture and water is 1 kg:9 L in the water leaching process, the water leaching temperature is 80° C., the leaching time is 3 hours, and the stirring speed is 600 rpm. After the water leaching reaction finishes, separate the solid residue from the liquid and filtrate to obtain the water leached residue;
(5) Second acid leaching: add hydrochloric acid solution into the water leaching residue obtained in step (4) for a secondary acid leaching process, and after the secondary acid leaching reaction is completed, separate the solid and the liquid and filtrate to obtain the leaching liquor 2. The molar concentration of hydrochloric acid solution is 10 mol/L, the solid-liquid ratio of the water leached residue and the hydrochloric acid solution is 1 kg:6 L, the leaching temperature is 85° C., the leaching time is 3 hours, and the stirring speed is 550 rpm;

(6) Preparation of rare-earth hydroxide: mix the leaching liquor 1 obtained in step (2) and the leaching liquor 2 obtained in step (5). Add ammonia solution with a mass percentage of 25% to the mixed solution while heating and stirring, until the pH of the solution reaches 9. Filtrate the mixture to obtain the rare-earth hydroxide. The heating temperature is 90° C., and the stirring speed is 600 rpm;

(7) Preparation of rare-earth chloride solution: add hydrochloric acid solution with a mass percentage of 37% to the rare-earth hydroxide obtained in step (6) for acidolysis, and after the white precipitate disappears, continue to add hydrochloric acid with a concentration of 37% by mass to the extend when the pH reaches 4 to obtain rare-earth chloride solution;

(8) Preparation of lanthanum cerium fluoro-carbonate: add hydrofluoric acid with a mass percentage of 40% to the rare-earth chloride solution obtained in step (7), and then add ammonium bicarbonate solution with a mass concentration of 100 g/L at a rate of 25 ml/min while stirring. Finally, add polyethylene glycol-800 to the mixed solution while stirring, age in a constant temperature water bath for 4 hours, and filter to obtain lanthanum cerium fluoro-carbonate; the volume ratio of rare-earth chloride to hydrofluoric acid is 20:1, and the volume ratio of ammonium bicarbonate solution and rare-earth chloride solution is 1:1. The temperature of water bath is 60° C., the mass percentage of polyethylene glycol-800 is 2%, and the stirring speed is 900 rpm;

(9) Regenerate rare-earth polishing powder: dry the lanthanum cerium fluoro-carbonate obtained in step (8) at 105° C. for 24 hours, and calcine at high temperature in a muffle furnace. The calcine process is as follows: raise the temperature from room temperature to 600° C.; keep at 600° C. for 2 hours; then raise the temperature from 600° C. to 1000° C. at a heating speed of 1° C./min; keep at 1000° C. for 5 hours; ball mill and obtain the regenerated rare-earth polishing powder.

The total leaching efficiency of rare earths in waste rare earth polishing powder was 96.3%, and the total recovery efficiency of rare earths was 93.8%.

Example 5

The rare-earth polishing powder waste is proceeded as follows:

(1) Ball milling pretreatment: the rare-earth polishing powder waste, whose total mass fraction of rare-earth oxides is 40%, is ball-milled to a particle size of 300 mesh to obtain ball-milled waste;

(2) First acid leaching: put the ball milled waste obtained in step (1) into a container and add hydrochloric acid solution. Heat and stir the mixture to promote acid leaching reaction, and filter after the first acid leaching process to obtain the solid residue and leaching liquor 1. The molar concentration of hydrochloric acid solution is 8 mol/L, the solid-liquid ratio of ball milled waste and hydrochloric acid solution is 1 kg:8 L, the leaching temperature is 80° C., and the leaching time is 2 hours at a stirring speed of 600 rpm;

(3) Alkali roasting: mix the leaching residue obtained in step (2) with alkali and roast the mixture. The mass ratio of leaching residue and alkali is 1:4, the roasting temperature is 950° C., and the roasting time is 2 hours;

(4) Water leaching: put the roasted mixture obtained in step (3) in water and stir. The solid-to-liquid ratio of the roasted mixture and water is 1 kg:9 L in the water leaching process, the water leaching temperature is 80° C., the leaching time is 2 hours, and the stirring speed is 400 rpm. After the water leaching reaction finishes, separate the solid residue from the liquid and filtrate to obtain the water leached residue;

(5) Second acid leaching: add hydrochloric acid solution into the water leaching residue obtained in step (4) for a secondary acid leaching process, and after the secondary acid leaching reaction is completed, separate the solid and the liquid and filtrate to obtain the leaching liquor 2. The molar concentration of hydrochloric acid solution is 10 mol/L, the solid-liquid ratio of the water leached residue and the hydrochloric acid solution is 1 kg:10 L, the leaching temperature is 90° C., the leaching time is 6 hours, and the stirring speed is 600 rpm;

(6) Preparation of rare-earth hydroxide: mix the leaching liquor 1 obtained in step (2) and the leaching liquor 2 obtained in step (5). Add ammonia solution with a mass percentage of 25% to the mixed solution while heating and stirring, until the pH of the solution reaches 9. Filtrate the mixture to obtain the rare-earth hydroxide. The heating temperature is 95° C., and the stirring speed is 600 rpm;

(7) Preparation of rare-earth chloride solution: add hydrochloric acid solution with a mass percentage of 37% to the rare-earth hydroxide obtained in step (6) for acidolysis, and after the white precipitate disappears, continue to add hydrochloric acid with a concentration of 37% by mass to the extend when the pH reaches 4 to obtain rare-earth chloride solution;

(8) Preparation of lanthanum cerium fluoro-carbonate: add hydrofluoric acid with a mass percentage of 40% to the rare-earth chloride solution obtained in step (7), and then add ammonium bicarbonate solution with a mass concentration of 100 g/L at a rate of 30 ml/min while stirring. Finally, add polyethylene glycol-600 to the mixed solution while stirring, age in a constant temperature water bath for 2 hours, and filter to obtain lanthanum cerium fluoro-carbonate; the volume ratio of rare-earth chloride to hydrofluoric acid is 30:1, and the volume ratio of ammonium bicarbonate solution and rare-earth chloride solution is 1:1. The temperature of water bath is 50° C., the mass percentage of polyethylene glycol-600 is 1%, and the stirring speed is 800 rpm;

(9) Regenerate rare-earth polishing powder: dry the lanthanum cerium fluoro-carbonate obtained in step (8) at 105° C. for 24 hours, and calcine at high temperature in a muffle furnace. The calcine process is as follows: raise the temperature from room temperature to 600° C.; keep at 600° C. for 3 hours; then raise the temperature from 600° C. to 1000° C. at a heating speed of 1° C./min; keep at 1000° C. for 6 hours; ball mill and obtain the regenerated rare-earth polishing powder.

The total leaching efficiency of rare earths in waste rare earth polishing powder was 96.4%, and the total recovery efficiency of rare earths was 94.1%.

Example 6

The rare-earth polishing powder waste is proceeded as follows:
(1) Ball milling pretreatment: the rare-earth polishing powder waste, whose total mass fraction of rare-earth oxides is 30%, is ball-milled to a particle size of 400 mesh to obtain ball-milled waste;
(2) First acid leaching: put the ball milled waste obtained in step (1) into a container and add hydrochloric acid solution. Heat and stir the mixture to promote acid leaching reaction, and filter after the first acid leaching process to obtain the solid residue and leaching liquor 1. The molar concentration of hydrochloric acid solution is 6 mol/L, the solid-liquid ratio of ball milled waste and hydrochloric acid solution is 1 kg:5 L, the leaching temperature is 80° C., and the leaching time is 3 hours at a stirring speed of 600 rpm;
(3) Alkali roasting: mix the leaching residue obtained in step (2) with alkali and roast the mixture. The mass ratio of leaching residue and alkali is 1:3, the roasting temperature is 1000° C., and the roasting time is 1 hours;
(4) Water leaching: put the roasted mixture obtained in step (3) in water and stir. The solid-to-liquid ratio of the roasted mixture and water is 1 kg:7 L in the water leaching process, the water leaching temperature is 80° C., the leaching time is 3 hours, and the stirring speed is 550 rpm. After the water leaching reaction finishes, separate the solid residue from the liquid and filtrate to obtain the water leached residue;
(5) Second acid leaching: add hydrochloric acid solution into the water leaching residue obtained in step (4) for a secondary acid leaching process, and after the secondary acid leaching reaction is completed, separate the solid and the liquid and filtrate to obtain the leaching liquor 2. The molar concentration of hydrochloric acid solution is 7 mol/L, the solid-liquid ratio of the water leached residue and the hydrochloric acid solution is 1 kg:5 L, the leaching temperature is 90° C., the leaching time is 4 hours, and the stirring speed is 600 rpm;
(6) Preparation of rare-earth hydroxide: mix the leaching liquor 1 obtained in step (2) and the leaching liquor 2 obtained in step (5). Add ammonia solution with a mass percentage of 25% to the mixed solution while heating and stirring, until the pH of the solution reaches 9. Filtrate the mixture to obtain the rare-earth hydroxide. The heating temperature is 95° C., and the stirring speed is 500 rpm;
(7) Preparation of rare-earth chloride solution: add hydrochloric acid solution with a mass percentage of 37% to the rare-earth hydroxide obtained in step (6) for acidolysis, and after the white precipitate disappears, continue to add hydrochloric acid with a concentration of 37% by mass to the extend when the pH reaches 4 to obtain rare-earth chloride solution;
(8) Preparation of lanthanum cerium fluoro-carbonate: add hydrofluoric acid with a mass percentage of 40% to the rare-earth chloride solution obtained in step (7), and then add ammonium bicarbonate solution with a mass concentration of 100 g/L at a rate of 30 ml/min while stirring. Finally, add polyethylene glycol-400 to the mixed solution while stirring, age in a constant temperature water bath for 2 hours, and filter to obtain lanthanum cerium fluoro-carbonate; the volume ratio of rare-earth chloride to hydrofluoric acid is 40:1, and the volume ratio of ammonium bicarbonate solution and rare-earth chloride solution is 1:1. The temperature of water bath is 60° C., the mass percentage of polyethylene glycol-400 is 1%, and the stirring speed is 1000 rpm;
(9) Regenerate rare-earth polishing powder: dry the lanthanum cerium fluoro-carbonate obtained in step (8) at 105° C. for 24 hours, and calcine at high temperature in a muffle furnace. The calcine process is as follows: raise the temperature from room temperature to 600° C.; keep at 600° C. for 3 hours; then raise the temperature from 600° C. to 1000° C. at a heating speed of 1° C./min; keep at 1000° C. for 5 hours; ball mill and obtain the regenerated rare-earth polishing powder.

The total leaching efficiency of rare earths in waste rare earth polishing powder was 95.6%, and the total recovery efficiency of rare earths was 93.7%.

Evaluation of Polishing Performance of Regenerated Rare-Earth Polishing Powder

The particle analysis of the final product is conducted on a Mastersizer 3000 Laser Diffraction Particle Size Analyzer. The grinding machine produced by Shenyang Kejing Auto-instrument Co., Ltd. was used, and the specific equipment model is UNIPOL-12005. The regenerated rare-earth polishing powder was prepared into a solution, and was used to conduct 6 polishing experiments on the ordinary K9 glass to test the polishing performance. The feeding rate of the rare-earth polishing liquid was 120 ml/min, and the polishing time was 30 minutes.

TABLE 1

Polishing performance by erosion amount and median particle size test results of regenerated rare-earth polishing powder

| | Median diameter(μm) | Amount of erosion (g) |
|---|---|---|
| Example 1 | 1.352 | 0.043 |
| Example 2 | 1.323 | 0.049 |
| Example 3 | 1.343 | 0.044 |
| Example 4 | 1.312 | 0.051 |
| Example 5 | 1.321 | 0.047 |
| Example 6 | 1.330 | 0.046 |

What is claimed is:
1. A method of separating and extracting rare-earth and regenerating rare-earth polishing powder from rare-earth polishing powder waste, characterized by the following specific steps:
(1) Ball milling pretreatment: the rare-earth polishing powder waste is ball milled to a particle size of less than 200 mesh to obtain ball milled waste;
(2) First acid leaching: put the ball milled waste obtained in step (1) into a container and add hydrochloric acid solution to obtain a mixture, heat and stir the mixture to conduct a first acid leaching reaction, and conduct filtration after the first acid leaching reaction is completed to obtain leaching residue and leaching liquor 1, molar concentration of the hydrochloric acid solution is 5-8 mol/L, a solid-liquid ratio of the ball milled waste and the hydrochloric acid solution is 1:4-1:8 kg/L, leaching temperature is 70-80° C., and leaching time is 1-3 hours at a stirring speed of 500-600 rpm;
(3) Alkali roasting: mix the leaching residue obtained in step (2) with alkali to obtain a mixture and roast the mixture to obtain a roasted mixture, a mass ratio of the leaching residue to the alkali is 1:1-1:5, roasting temperature is 800-1000° C., and roasting time is 1-3 hours;

(4) Water leaching: put the roasted mixture obtained in step (3) in water and stir, a solid-to-liquid ratio of the roasted mixture and water is 1:4-1:9 kg/L in water leaching process, water leaching temperature is 80-90° C., water leaching time is 2-3 hours, and stirring speed is 500 to 600 rpm, after the water leaching process finishes, separate solid residue from liquid phase and conduct filtration to obtain water leaching residue;

(5) Second acid leaching: add hydrochloric acid solution into the water leaching residue obtained in step (4) for a secondary acid leaching reaction, and after the secondary acid leaching reaction is completed, separate solid and liquid phase and conduct filtration to obtain leaching liquor 2, a molar concentration of the hydrochloric acid solution is 6-10 mol/L, a solid-liquid ratio of the water leaching residue and the hydrochloric acid solution is 1:4-1:10 kg/L, leaching temperature is 80-90° C., leaching time is 2-6 hours, and stirring speed is 500-600 rpm;

(6) Preparation of rare-earth hydroxide: mix the leaching liquor 1 obtained in step (2) and the leaching liquor 2 obtained in step (5) to obtain a mixed solution, add an ammonia solution with a mass percentage of 25% to the mixed solution while heating and stirring, until the pH of the solution reaches 8-9, conduct filtration to obtain rare-earth hydroxide, heating temperature is 90-95° C., and stirring speed is 500-600 rpm;

(7) Preparation of rare-earth chloride solution: add a hydrochloric acid solution with a mass percentage of 37% to the rare-earth hydroxide obtained in step (6) for acidolysis, and after white precipitate disappears, continue to add hydrochloric acid with a concentration of 37% by mass until pH reaches 2-4 to obtain a rare-earth chloride solution;

(8) Preparation of lanthanum cerium fluoro-carbonate: add hydrofluoric acid with a mass percentage of 40% to the rare-earth chloride solution obtained in step (7), and add an ammonium bicarbonate solution with a mass concentration of 100-120 g/L at a rate of 20-30 ml/min while stirring, then add dispersant to the mixed solution while stirring, age in a constant temperature water bath for 2-4 hours, and conduct filtration to obtain lanthanum cerium fluoro-carbonate; a volume ratio of rare-earth chloride to hydrofluoric acid is 20:1-40:1, and a volume ratio of the ammonium bicarbonate solution to the rare-earth chloride solution is 1:1, a temperature of water bath is 50-60° C., a mass percentage of the dispersant is 1-2%, and stirring speed is 800-1000 rpm;

(9) Regenerate rare-earth polishing powder: dry the lanthanum cerium fluoro-carbonate obtained in step (8) at 105° C. for 24 hours, and calcine at high temperature in a muffle furnace, the calcine process is as follows: raise the temperature from room temperature to 600° C.; keep at 600° C. for 2-3 hours; then raise the temperature from 600° C. to 1000° C. at a heating speed of 1° C./min; keep at 1000° C. for 4-6 hours; ball mill and obtain regenerated rare-earth polishing powder.

2. The method according to claim 1, wherein the alkali used in the alkali roasting process in step (3) is NaOH or KOH.

3. The method according to claim 1, wherein the dispersant used in step (8) is one of the followings: polyethylene glycol-400, polyethylene glycol-600 or polyethylene glycol-800.

* * * * *